(12) United States Patent
Saito

(10) Patent No.: US 6,514,165 B2
(45) Date of Patent: Feb. 4, 2003

(54) SHIFT CONTROL SYSTEM AND METHOD FOR AUTOMATIC TRANSMISSIONS

(75) Inventor: Yuji Saito, Shizuoka (JP)

(73) Assignee: Jatco Transtechnology Ltd., Fuji (JP)

( * ) Notice: Subject to any disclaimer, the term of this patent is extended or adjusted under 35 U.S.C. 154(b) by 0 days.

(21) Appl. No.: 09/953,969

(22) Filed: Sep. 18, 2001

(65) Prior Publication Data

US 2002/0034999 A1 Mar. 21, 2002

(30) Foreign Application Priority Data

Sep. 18, 2000 (JP) .................................... 2000-282343

(51) Int. Cl.$^7$ .............................................. F16H 59/36
(52) U.S. Cl. ........................ 475/118; 475/121; 477/154
(58) Field of Search .................................. 475/116, 118, 475/121, 122, 123; 477/34, 154

(56) References Cited

U.S. PATENT DOCUMENTS

| | | | | |
|---|---|---|---|---|
| 3,744,347 A | * | 7/1973 | Kubo et al. ................... | 477/154 |
| 4,719,820 A | * | 1/1988 | Hibino et al. ................. | 477/34 |
| 5,383,820 A | * | 1/1995 | Mori .......................... | 475/123 |
| 5,489,248 A | | 2/1996 | Tazawa ....................... | 477/148 |
| 5,613,921 A | | 3/1997 | Sugiyama et al. .......... | 477/125 |
| 5,643,124 A | | 7/1997 | Sugiyama et al. .......... | 475/123 |
| 5,771,171 A | | 6/1998 | Tazawa .................. | 364/424.08 |
| 6,007,458 A | * | 12/1999 | Ohashi et al. ............... | 477/154 |
| 6,102,825 A | * | 8/2000 | Hisano et al. ............... | 475/118 |

FOREIGN PATENT DOCUMENTS

| | | | |
|---|---|---|---|
| JP | 8-159266 | 6/1996 | ................. 475/123 |

OTHER PUBLICATIONS

U.S. patent application Ser. No. 09/936,811, Murasugi et al., filed Sep. 18, 2001.
U.S. patent application Ser. No. 09/953,895, Saito, filed Sep. 18, 2001.
U.S. patent application Ser. No. 09/953,936, Kato, filed Sep. 18, 2001.
U.S. patent application Ser. No. 09/953,893, Tanaka et al., filed Sep. 18, 2001.
U.S. patent application Ser. No. 09/953,937, Saito, filed Sep. 18, 2001.
U.S. patent application Ser. No. 09/953,966, Saito, filed Sep. 18, 2001.
U.S. patent application Ser. No. 09/953,967, Saito, filed Sep. 18, 2001.
U.S. patent applicaiton Ser. No. 09/953,968, Saito, filed Sep. 18, 2001.
U.S. patent application Ser. No. 09/953,972, Saito, filed Sep. 18, 2001.
U.S. patent application Ser. No. 09/954,017, Murasugi et al., filed Sep. 18, 2001.
U.S. patent application Ser. No. 09/954,019, Saito, filed Sep. 18, 2001.
U.S. patent application Ser. No. 09/954,298, Saito, filed Sep. 18, 2001.

* cited by examiner

*Primary Examiner*—Sherry Estremsky
(74) *Attorney, Agent, or Firm*—Foley & Lardner

(57) ABSTRACT

In an automatic transmission, transient control of the working oil pressures for friction elements whose state is to be switched is normally carried out in accordance with a degree of shift development determined based on at least a vehicle speed. When the vehicle speed is too low to provide determination of the degree of shift development, transient control of the working oil pressures for the friction elements is carried out in accordance with elapsed time from shift instead of normal transient control.

11 Claims, 7 Drawing Sheets

FIG.2

|   | R/C | H/C | L/C | LR/B | L/OWC | 2-4/B |
|---|---|---|---|---|---|---|
| 1st |  |  | ○ | ◌ | ○ |  |
| 2nd |  |  | ○ |  |  | ○ |
| 3rd |  | ○ | ○ |  |  |  |
| 4th |  | ○ |  |  |  | ○ |
| Rev | ○ |  |  | ○ |  |  |

NORMAL MODE

1st RANGE

2nd RANGE

D RANGE

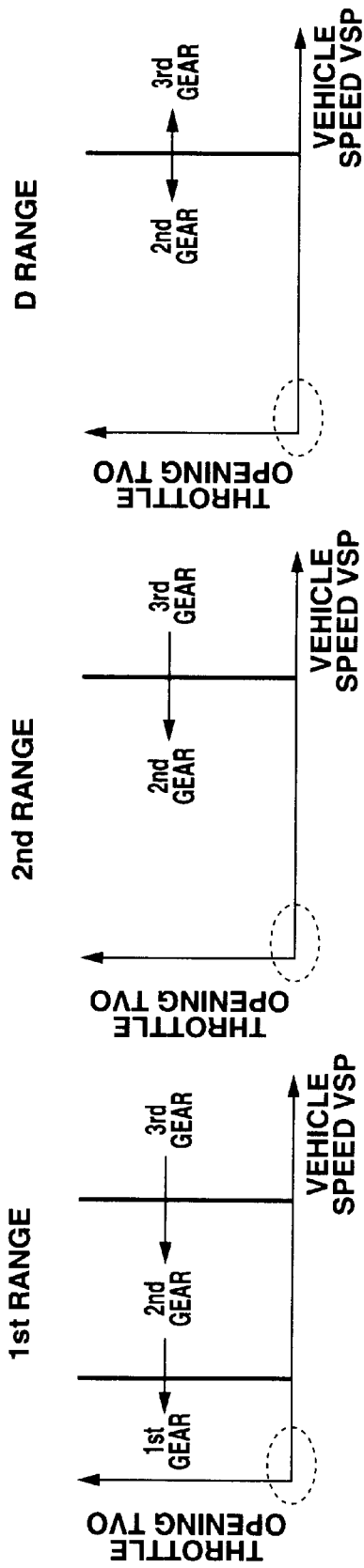
FIG.7A 1st RANGE
FIG.7B 2nd RANGE
MANUAL SHIFT MODE (SNOW MODE)
FIG.7C D RANGE

SHIFT CONTROL SYSTEM AND METHOD FOR AUTOMATIC TRANSMISSIONS

BACKGROUND OF THE INVENTION

The present invention relates generally to a shift control system and method for automatic transmissions, and more particularly, to a shift control system and method for automatic transmissions of the direct-operated valve type wherein working oil pressures for respective friction elements are controlled individually.

In automatic transmissions, a power transfer route of a gear transmission mechanism or a gear position is determined by selectively hydraulically actuating or engaging friction elements such as clutch and brake. Rotation input from an engine is converted at a ratio responsive to the selected gear position to produce an output. In short, the shift is achieved by changing one gear position to another through switching of the friction elements to be engaged.

There are automatic transmissions of the direct-operated valve type wherein working oil pressures for respective friction elements can be controlled individually by solenoid valves or the like without using any buffer such as accumulator. In the transmissions, transient control of the working oil pressures for friction elements whose state is to be switched at the shift is carried out freely without being affected by the other friction elements. Moreover, due to no use of a buffer such as accumulator, transient control of the working oil pressures for friction elements can be carried out finely in accordance with the degree of shift development without being affected by the state of the buffer. Thus, the transmissions can achieve excellent shift quality in conformity of the requirements.

It is proposed to determine the degree of shift development in accordance with an effective gear ratio expressed by the ratio of transmission input rpm to transmission output rpm (=vehicle speed). Specifically, shift control is determined in accordance with inertia-phase start determination that the effective gear ratio starts to change from a gear ratio before shift to a gear ratio after shift, or inertia-phase finish determination that the effective gear ratio reaches the gear ratio after shift, or a value of the effective gear ratio during inertia phase. It is understood that, in all cases, the degree of shift development is determined in accordance with at least a vehicle-speed detected value.

However, at the shift in the vicinity of zero vehicle speed, remarkably degraded detection accuracy of the vehicle speed, etc. cause lowering of the effective gear ratio obtained as will be described later, making inaccurate determination of the degree of shift development which is carried out in accordance with the effective gear ratio. This may result in no determination of the degree of shift development which already reaches a value where control should be switched to a next phase. Thus, the automatic transmissions of the direct-operated valve type cannot achieve excellent shift quality in conformity of the requirements, losing the biggest advantage thereof.

SUMMARY OF THE INVENTION

It is, therefore, an object of the present invention to provide a shift control system and method for automatic transmissions, which allows achievement of excellent shift quality in conformity of the requirements.

The present invention generally provides an automatic transmission, comprising:

a plurality of friction elements, the friction elements being selectively engaged at shift through respective oil pressures controlled individually to determine a selected gear position; and a controller that controls the oil pressures for the friction elements whose state is to be switched, wherein the controller carries out a first transient control in accordance with a degree of shift development determined based on at least a vehicle speed, and wherein the controller carries out instead of the first transient control a second transient control in accordance with an elapsed time from when the vehicle speed is too low to provide determination of the degree of shift development.

One aspect of the present invention is to provide a method of controlling an automatic transmission with a plurality of friction elements, the friction elements being selectively engaged at shift through respective oil pressures controlled individually to determine a selected gear position, the method comprising:

controlling the oil pressures for the friction elements whose state is to be switched;

carrying out a first transient control in accordance with a degree of shift development determined based on at least a vehicle speed; and carrying out instead of the first transient control a second transient control in accordance with an elapsed time from shift when the vehicle speed is too low to provide determination of the degree of shift development.

Another aspect of the present invention is to provide a system for controlling an automatic transmission with a plurality of friction elements, the friction elements being selectively engaged at shift through respective oil pressures controlled individually to determine a selected gear position, the system comprising:

means for controlling the oil pressures for the friction elements whose state is to be switched;

means for carrying out a first transient control in accordance with a degree of shift development determined based on at least a vehicle speed; and means for carrying out instead of the first transient control a second transient control in accordance with an elapsed time from shift when the vehicle speed is too low to provide determination of the degree of shift development.

BRIEF DESCRIPTION OF THE DRAWINGS

The other objects and features of the present invention will be apparent from the following description with reference to the drawings wherein:

FIG. 2 is a table illustrating the relationship between each selected gear position and the engagement logic of friction elements in an automatic transmission;

FIGS. 7A–7C are views similar to FIGS. 6A–6C, showing shift patterns of the automatic transmission in the manual shift mode or snow mode and for $1^{st}$, $2^{nd}$, and D ranges.

DETAILED DESCRIPTION OF THE INVENTION

Generally, the vehicle speed is calculated by using a rotary member rotating in proportion to the transmission output rpm and having marks at every predetermined angles. Specifically, the transmission output rpm is obtained by measuring time required for passage between adjacent marks (periodic measurement) or the number of marks passing during a predetermined period of time (frequency measurement), from which the vehicle speed is calculated.

As a consequence, in the vicinity of zero vehicle speed where the transmission output rpm has a minute value, e.g. immediately before vehicle stop or wheel brake lock, time required for passage between marks elongates significantly, or the number of marks passing during a predetermined period of time decreases remarkably, resulting in considerably degraded detection accuracy of the vehicle speed, and thus lowered accuracy of the effective gear ratio obtained therefrom.

Moreover, since low vehicle speed involves relatively low transmission input rpm, the detection accuracy of the transmission input rpm becomes degraded for the same reason, leading to further lowered accuracy of the effective gear ratio expressed by the transmission input/output rpm ratio.

Additionally, when the vehicle speed becomes completely zero, the effective gear ratio expressed by the transmission input/output rpm ratio has zero denominator, resulting in impossible obtaining of the effective gear ratio.

Therefore, under such circumstances, the degree of shift development cannot be determined accurately, disabling the automatic transmission of the direct-operated valve type to achieve excellent shift quality in conformity of the requirements, losing the biggest advantage thereof.

Figure 6A:
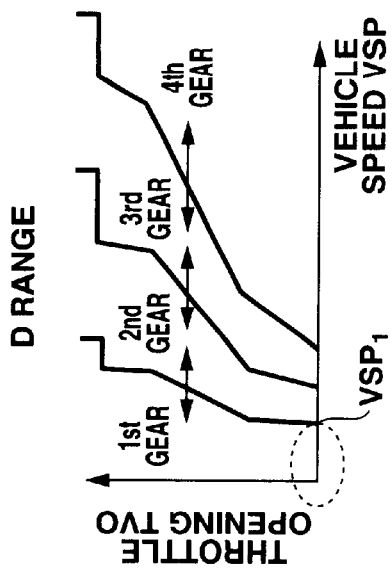
FIGS. 6A–C are diagrams showing shift patterns of the automatic transmission in the normal mode and for $1^{st}$, $2^{nd}$, and D ranges.
Figure 6B:
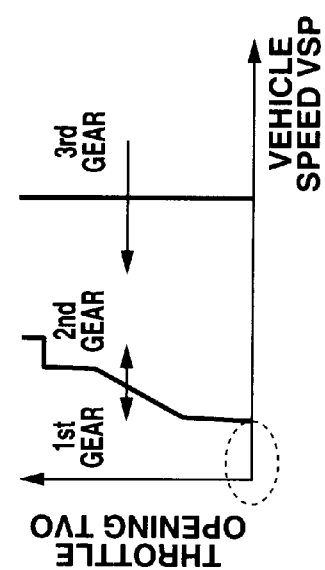
Figure 6C:
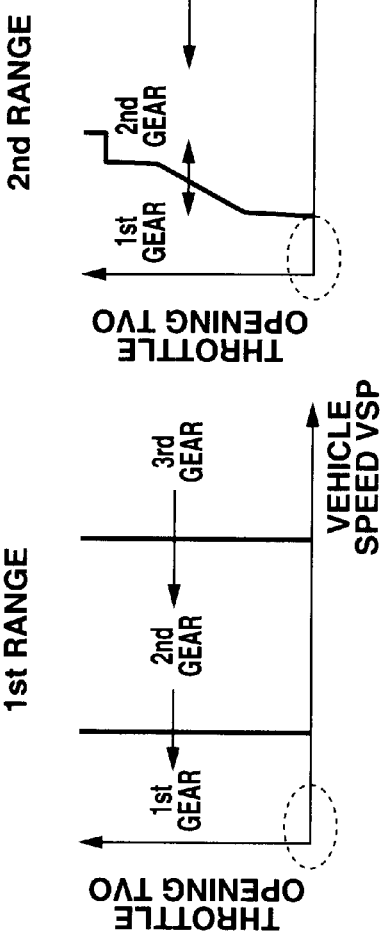

Referring to FIGS. 6A–6C, in the normal mode for normal automatic-shift drive, a shift pattern in the form of a two-dimensional map of a vehicle speed VSP and a throttle opening degree TVO is established as illustrated in FIG. 6A for a first-gear engine-brake range or $1^{st}$ range, in FIG. 6B for a second-gear engine-brake range or $2^{nd}$ range, and in FIG. 6C for an automatic-shift range or D range.

Therefore, in the vicinity of zero vehicle speed as encircled by broken line in FIGS. 6A–6C, the shift cannot occur normally in any range and even with switching between any two ranges.

However, referring to FIG. 6C, when the wheels are locked due to hard braking during drive, etc., a 2-1 shift command is generated at a vehicle speed VSP, on the shift pattern. However, due to response lag of the command, the 2-1 shift can occur even in the vicinity of zero vehicle speed.

Moreover, referring to FIGS. 7A–7C, in the manual shift mode, snow mode for snowy road or the like, the shift pattern is established as illustrated in FIGS. 7A–7C for $1^{st}$, $2^{nd}$, and D ranges. In this mode, even in the vicinity of zero vehicle speed as encircled by broken line, the shift occurs with switching between the $1^{st}$ and $2^{nd}$ ranges or between the $1^{st}$ and D ranges.

As described above, at the shift in the vicinity of zero vehicle speed, remarkably degraded detection accuracy of the vehicle speed, etc. cause lowering of the effective gear ratio obtained, making inaccurate determination of the degree of shift development which is carried out in accordance with the effective gear ratio. This may result in no determination of the degree of shift development which already reaches a value where control should be switched to a next phase.

In this case, control will not enter a next phase to the end of time, so that shift-control time becomes longer than the actually required one or redundant, which inevitably elongates working time of solenoid valves for directly controlling the working oil pressure for the friction elements with a problem of operation noise raised.

Moreover, an action to be taken when a change in situation occurs due to operation of an accelerator pedal, etc. is more difficult during shift than during non-shift. Thus, when shift-control time is longer, the problems arise that a driver is required to more attentively fulfill an action when a change in situation occurs during shift, and that the possibility is increased in occurrence of an anxious shock. In all cases, the automatic transmissions of the direct-operated valve type cannot achieve excellent shift quality in conformity of the requirements, leading to possible loss of the biggest advantage thereof.

Figure 1:
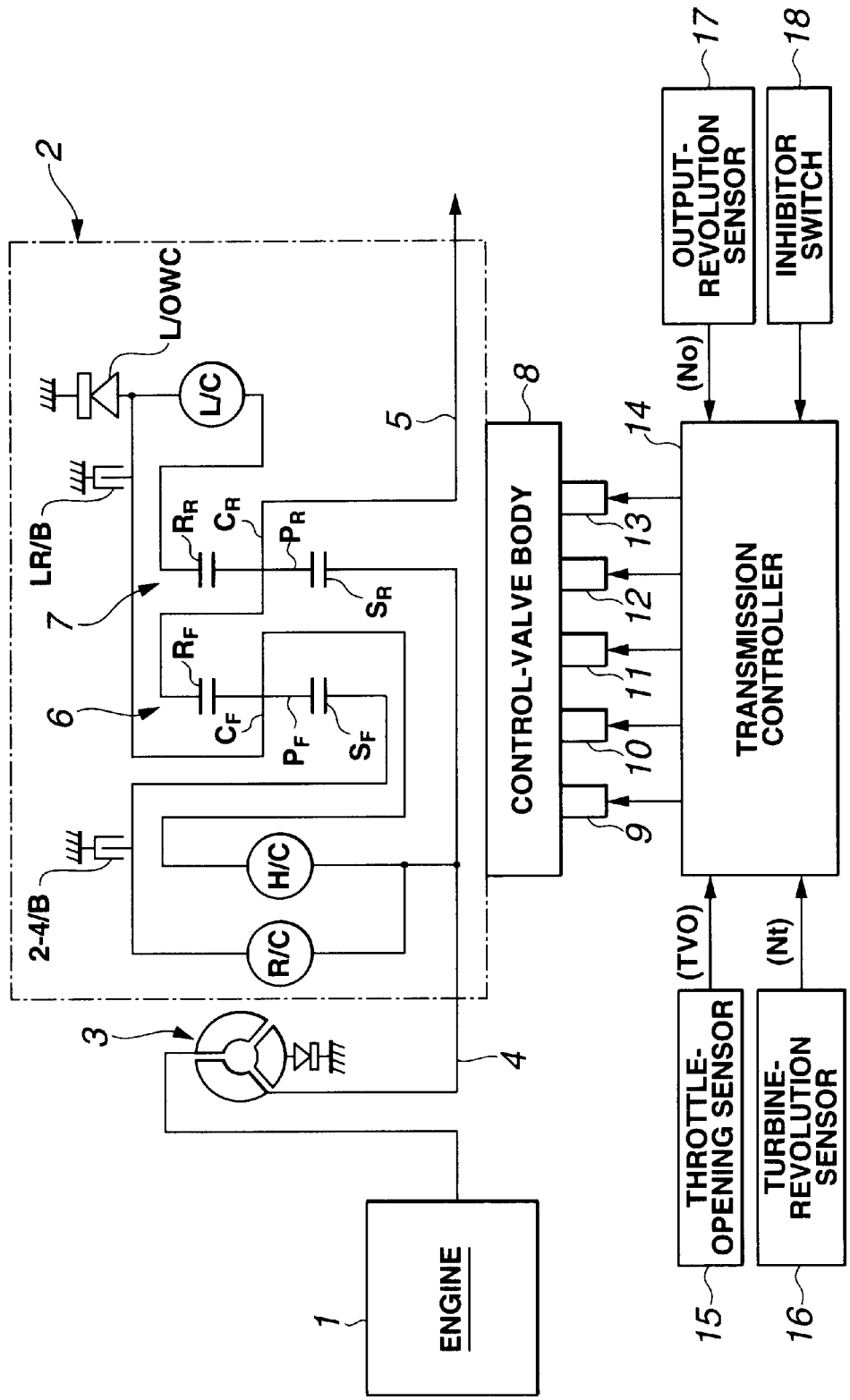
FIG. 1 is a block diagram showing a power train of a motor vehicle with a shift control system, to which the present invention is applied.

Referring to FIGS. 1–5, a shift control system and method for automatic transmissions embodying the present invention will be described. Referring to FIG. 1, an engine 1 produces an output controlled by a throttle valve that varies from a fully closed position to a fully open position in accordance with depression of the accelerator pedal operated by a driver. Output rotation of the engine 1 is provided to an input shaft 4 of an automatic transmission 2 through a torque converter 3.

The automatic transmission 2 comprises input and output shafts 4, 5 coaxially butt-disposed, and front and rear planetary-gear sets 6, 7 mounted thereon in this order from the engine 1, which form main components of a planetary-gear transmission mechanism of the transmission 2.

The front planetary-gear set 6 close to the engine 1 is a simple planetary-gear set comprising a front sun gear $S_F$, a front ring gear $R_F$, a front pinion $P_F$ meshed with the two, and a front carrier $C_F$ for rotatably supporting the front pinion.

Likewise, the rear planetary-gear set 7 distant from the engine 1 is a simple planetary-gear set comprising a rear sun gear $S_F$, a rear ring gear $R_R$, a rear pinion $P_R$ meshed with the two, and a rear carrier $C_R$ for rotatably supporting the rear pinion.

Friction elements for determining a transfer route or gear position of the planetary-gear transmission mechanism are a low clutch L/C, a second/fourth-gear brake 2-4/B, a high clutch H/C, a low reverse brake LR/B, a low one-way clutch L/OWC, and a reverse clutch R/C, which are arranged in correlation to the components of the planetary-gear sets 6, 7.

Specifically, the front sun gear $S_F$ can be coupled with the input shaft 4 by the reverse clutch R/C as required, and be put stationary by the second/fourth-gear brake 2-4/B as required.

The front carrier $C_F$ can be coupled with the high clutch H/C as required. Moreover, the front carrier $C_F$ is prevented from having reverse rotation to engine rotation by the low one-way clutch L/OWC, and can be put stationary by the low reverse brake LR/B as required.

The front carrier $C_F$ and the rear ring gear $R_R$ can be coupled with each other by the low clutch L/C as required.

The front ring gear $R_F$ and the rear carrier $C_R$ are coupled with each other and with the output shaft 6, and the rear sun gear $S_R$ is coupled with the input shaft 4.

Figure 2:
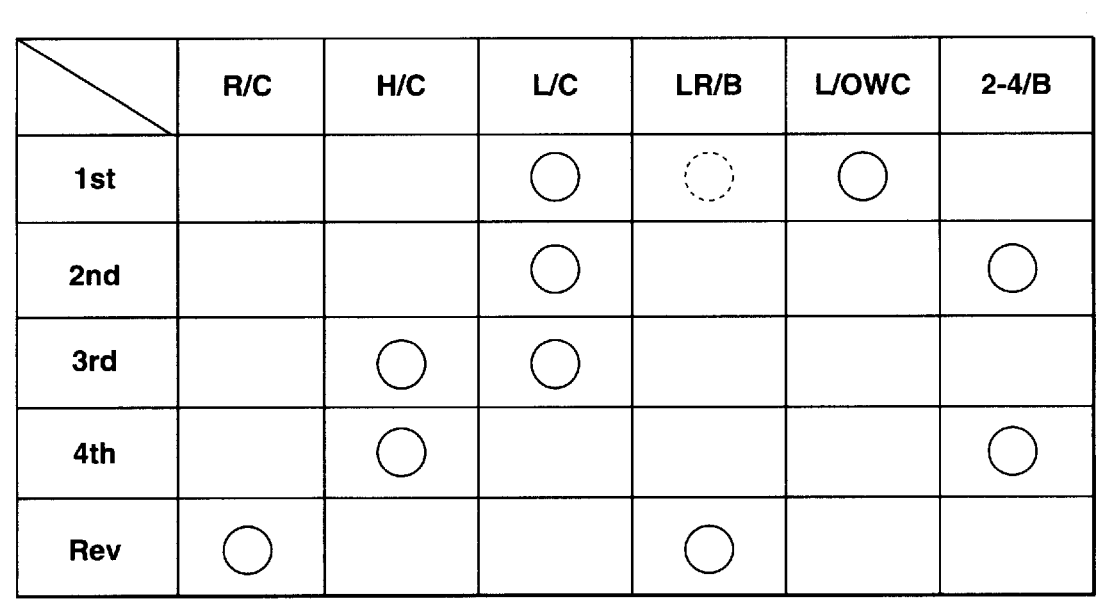

Referring to FIG. 2, a power train of the planetary-gear transmission mechanism can achieve four forward gear positions including forward first, second, third, and fourth gear positions $1^{st}$, $2^{nd}$, $3^{rd}$, $4^{th}$, and one reverse gear position Rev by selective hydraulic actuation or engagement of the friction elements L/C, 2-4/B, H/C, LR/B, R/C given by solid-line circle and self-engagement of the low one-way clutch L/OWC given by solid-line circle.

At the forward first gear $1^{st}$, with the low clutch L/C engaged, power transmission is carried out through the low one-way clutch L/OWC as a reaction-force receiver. When releasing the accelerator pedal during the forward first gear $1^{st}$ to go into coasting or inertia drive, the low one-way clutch L/OWC is in free run to make engine brake ineffective. This can prevent passengers from having a uncomfortable feel due to engine brake produced by release of the accelerator pedal at lower gear.

If engine brake is needed during the forward first gear $1^{st}$, the low reverse clutch LR/B is hydraulically actuated or engaged as given by broken-line circle in FIG. 2 to disable free run of the low one-way clutch L/OWC, which make engine brake effective.

Referring to FIGS. 1–2, the engagement logic of the friction elements L/C, 2-4/B, H/C, LR/B, R/C is realized by a control-valve body 8 having, in addition to a pressure regulator valve and a manual valve, not shown, a line-pressure solenoid 9, a low-clutch solenoid 10, a second/fourth-gear-brake solenoid 11, a high-clutch solenoid 12, a low-reverse-brake solenoid 13, etc. mounted thereto.

In the ON state, the line-pressure solenoid 9 applies the solenoid pressure to the pressure regulator valve to increase the line pressure, whereas in the OFF state, it operates to decrease the line pressure. The line pressure switched between high and low levels is used as source pressure for shift control. The manual valve is operated to a forward-drive (D) range position, a reverse-drive (R) range position or a parking or neutral (P or N) range position.

In the D range position, the manual valve supplies the line pressure as D range pressure to the low-clutch solenoid 10, the second/fourth-gear-brake solenoid 11, the high-clutch solenoid 12, and the low-reverse-brake solenoid 13. In accordance with the solenoid pressures produced out of the D range pressure through duty control, the solenoids 10–13 reduce the line pressure for the corresponding low clutch L/C, second/fourth-gear brake 2-4/B, high clutch H/C, and low reverse brake LR/B to allow individual control of the working oil pressures for those friction elements. Thus, duty control of the solenoids 10–13 allows achievement of the engagement logic of the first to fourth gear positions as shown in FIG. 2.

In the R range position, the manual valve provides the line pressure as R range pressure to the reverse clutch R/C and the low reverse brake LR/B for engagement thereof, allowing achievement of the engagement logic of the reverse gear position as shown in FIG. 2.

In the P and N range positions, the manual valve does not supply the line pressure to any circuit to put all friction elements in the released state, obtaining the neutral state of the automatic transmission.

Referring to FIG. 1, a transmission controller 14 carries out ON-OFF control of the line-pressure solenoid 9, i.e. switching of the line pressure between high and low levels, and duty control of the low-clutch solenoid 10, the second/fourth-gear-brake solenoid 11, the high-clutch solenoid 12, and the low-reverse-brake solenoid 13. The transmission controller 14 receives a signal out of a throttle-opening sensor 15 for sensing a throttle opening degree TVO of the engine 1, a signal out of a turbine-revolution sensor 16 for sensing a turbine rpm Nt that corresponds to an output rpm of the torque converter 3 or transmission input rpm, a signal out of an output-revolution sensor 17 for sensing an rpm No of the output shaft 5 of the automatic transmission 2, and a signal out of an inhibitor switch 18 for detecting a selected range.

Automatic shift operation in the D range will be described. The transmission controller 14 carries out a control program, not shown, to search, in accordance with the throttle opening degree IVO and the transmission output rpm No or vehicle speed, a predetermined shift map for a preferable gear position required in actual drive conditions.

Then, the transmission controller 14 is determined whether or not an actually selected gear position corresponds to the preferable gear position. If the actually selected gear position fails to correspond to the preferable gear position, the controller 14 produces a shift command to alter the working oil pressure for the friction elements for the shift through duty control of the solenoids 10–13, allowing the shift to the preferable gear position, i.e. carrying out switching between engagement and release of the friction elements in accordance with the table of engagement logic in FIG. 2.

Figure 3:
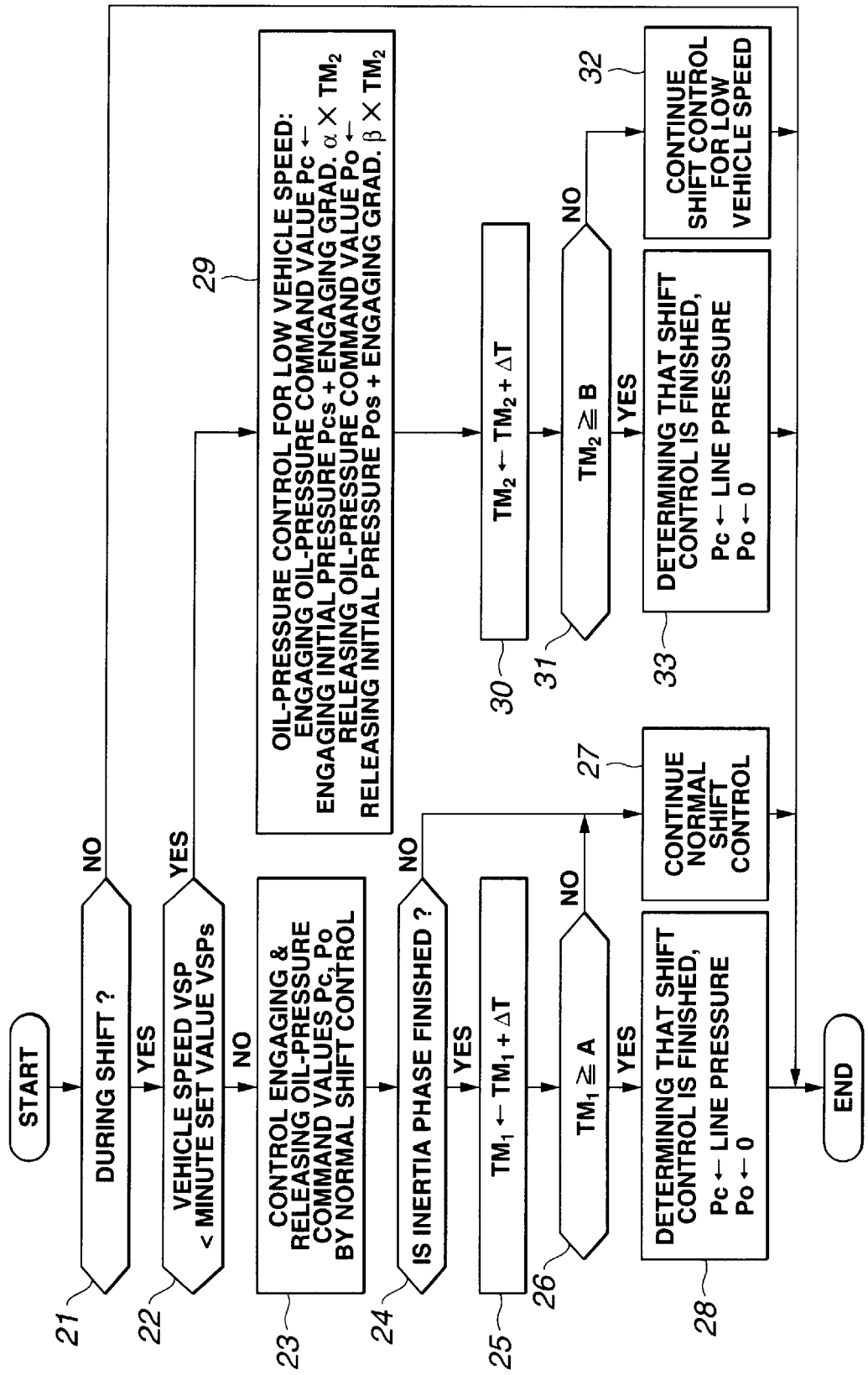
FIG. 3 is a flowchart showing operation of an embodiment of the present invention.

Referring to FIG. 3, shift control will be described with regard to execution of 2-3 upshift, for example.

Figure 4:
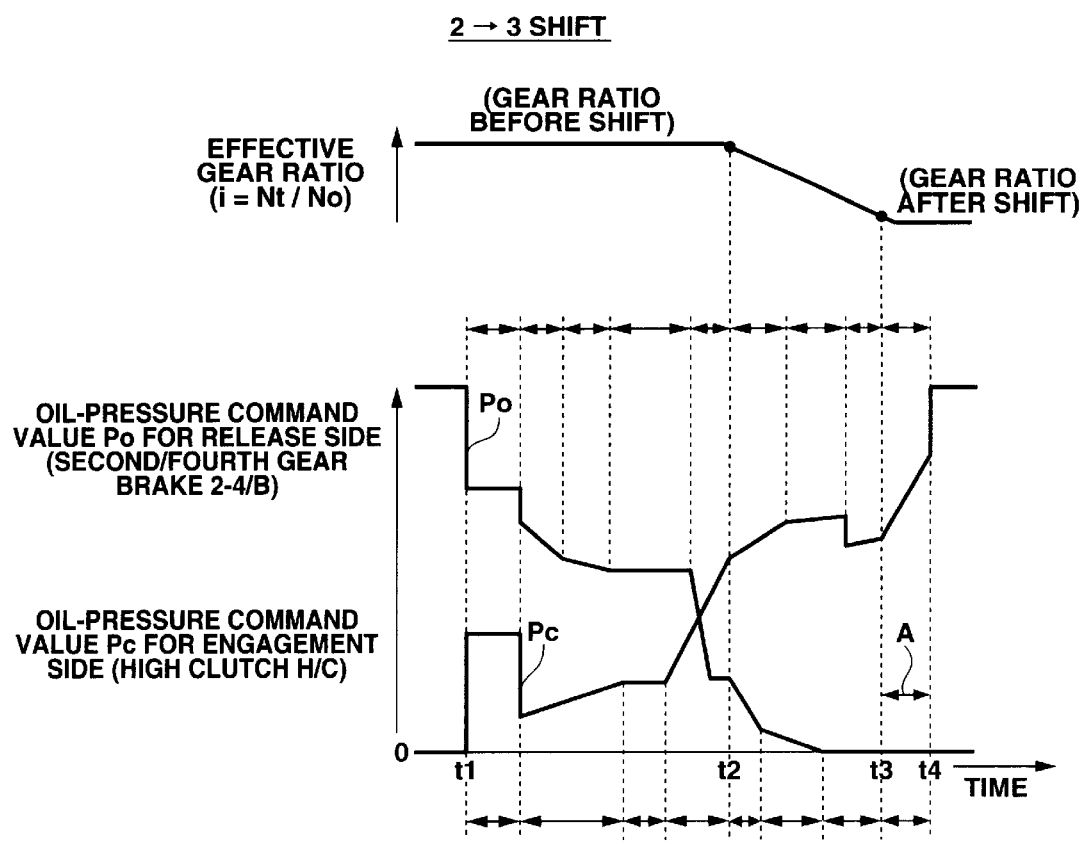
FIG. 4 is a time chart illustrating normal 2-3 upshift which the shift control system carries out except at very low vehicle speed.

At a step 21, it is determined whether or not the shift is in execution. If it is determined that the shift is not in execution, flow comes to an end. On the other hand, if it is determined that the shift is in execution, shift control is carried out as follows:

At a step 22, it is determined whether or not the vehicle speed VSP obtained by processing a detected signal of the transmission output rpm No is in the low vehicle-speed range wherein a significant degradation of the detection accuracy occurs, i.e. the vehicle speed VSP is smaller than a predetermined set value VSPs At the step 22, if it is determined that the vehicle speed VSP is not in the low vehicle-speed range, i.e. VSP≧VSPs, flow proceeds to a step 23 where normal shift control (first transient control) is carried out as shown in FIG. 4. Normal shift control involves execution of phase-development determination in accordance with the degree of shift development determined based on the effective gear ratio i expressed by the ratio of the transmission input rpm Nt to the vehicle speed VSP or transmission output rpm No.

Specifically, as seen from FIG. 2, the friction elements whose state is to be switched at the shift or 2-3 upshift include second/fourth-gear brake 2-4B as engagement-side friction element to be switched from the released state to the engaged state, and high clutch H/C as release-side friction element to be switched from the engaged state to the released state. Command values Pc, Po of the working oil pressure for the engagement-side friction element and the release-side friction element are determined with respect to a shift-command instant t1, an inertia-phase start determination instant t2 where the effective gear ratio i starts to change from the gear ratio before shift to the gear ratio after shift and an inertia-phase finish determination instant t3 where the effective gear ratio i reaches the gear ratio after shift, and elapsed times therefrom as shown, for example, in FIG. 4.

At a subsequent step 24, it is determined whether or not the effective gear ratio i reaches the gear ratio after shift, i.e. time comes at the inertia-phase finish instant t3 as shown in FIG. 4. If it is determined that the inertia phase has finished, flow proceeds to a step 25 where a timer $TM_1$ is incremented by an operation period $\Delta T$ of FIG. 3 to measure elapsed time from the inertia-phase finish instant t3. Then, at a step 26, it is determined whether or not the timer $TM_1$ indicates a value equal to or greater than a predetermined set time A, i.e. time comes at an instant t4 as shown in FIG. 4.

If, at the step 24, it is determined that the inertia phase has not finished yet (before t3), or at the step 26, it is determined that the predetermined set time A has not elapsed yet (before t4), flow proceeds to a step 27 where it is continued normal shift control wherein the engagement-side and release-side working-oil-pressure command values Pc, Po are determined as illustrated in FIG. 4, i.e. shift control involving execution of phase development determination in accordance with the degree of shift development.

On the other hand, at the steps 24 and 26, if it is determined that the inertia phase has finished, and the predetermined set time A has elapsed to come at the instant t4 as shown in FIG. 4, flow proceeds to a step 28 where determining that shift control should be finished, the engagement-side working-oil-pressure command value Pc is established to a maximum value equal to the line pressure corresponding to source pressure, whereas the release-side working-oil-pressure command value Po is maintained at zero.

Figure 5:
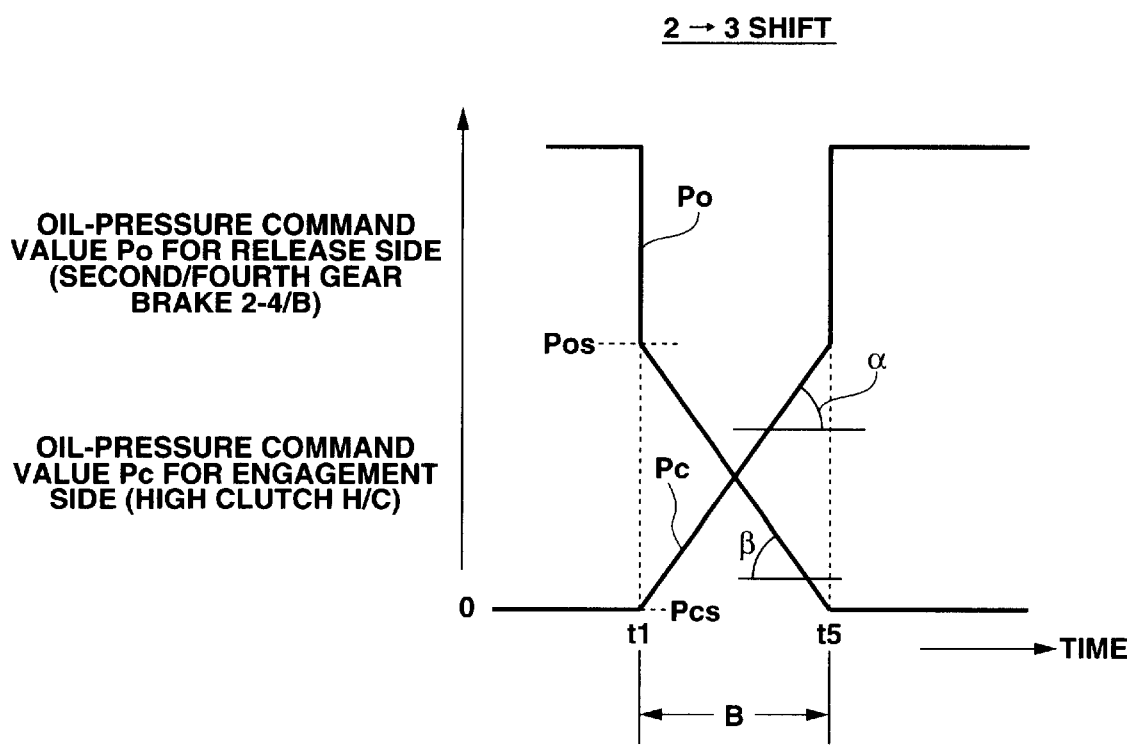
FIG. 5 is a view similar to FIG. 4, illustrating 2-3 upshift for low vehicle speed, which the shift control system carries out at very low vehicle speed.

On the other hand, at the step 22, if it is determined that the vehicle speed VSP is in the low vehicle-speed range wherein a significant degradation of the detection accuracy occurs, i.e. VSP<VSPs, shift or oil-pressure control (second transient control) for low vehicle speed as shown in FIG. 5 is carried out at steps 29–30.

Specifically, referring to FIG. 5, at the step 29, the engagement-side working-oil-pressure command value Pc is increased from an engagement-side initial pressure Pcs (=0) corresponding to a value at the shift-command instant t1 at a predetermined engagement-side gradient $\alpha$. And the release side working-oil-pressure command value Po is decreased from a release-side initial pressure Pos for preventing a release response lag at a predetermined release-side gradient $\beta$.

For that purpose, the engagement-side working-oil-pressure command value Pc is obtained by adding the engagement-side initial pressure Pcs to the product of the engagement-side gradient $\alpha$ and a value of a timer $TM_2$ for measuring elapsed time from the shift-command instant t1. And the release side working-oil-pressure command value Po is obtained by adding the release-side initial pressure Pos to the product of the release-side gradient $\beta$ and a value of the timer $TM_2$.

At a subsequent step 30, the timer $TM_2$ is incremented by the operation period $\Delta T$ of FIG. 3 to measure elapsed time from the shift-command instant t1. And at a step 31, it is determined whether or not the timer $TM_2$ indicates a value equal to or greater than a predetermined set time B, i.e. time comes at an instant t5 in FIG. 5.

At the step 31, if it is determined that the set time B fails to elapse from the shift-command instant t1 ($TM_2$<B), i.e. time fails to come at the instant t5 as shown in FIG. 5, control proceeds to a step 32 wherein it is continued shift control for low vehicle speed.

Therefore, in contrast to shift control involving execution of phase development determination based on the degree of shift development determined out of the effective gear ratio i as shown in FIG. 4 or vehicle speed VSP, shift control for low vehicle speed as shown in FIG. 5 is control carried out generally based on elapsed time from the shift-command instant t1.

On the other hand, at the step 31, if it is determined that $TM_2 \geq B$, i.e. time comes at the instant t5 as shown in FIG. 5, control proceeds to a step 33 where determining that shift control should be finished, the engagement-side working-oil-pressure command value Pc is established to a maximum value equal to the line pressure corresponding to source pressure, whereas the release-side working-oil-pressure command value Po is maintained at zero.

In the illustrative embodiment, when the vehicle speed VSP is too low (VSP<VSPS) to provide accurate effective gear ratio i as shown in FIG. 4, and therefore accurate determination of the degree of shift development in accordance therewith, the engagement-side and release-side working-oil-pressure command values Pc, Po are increased and decreased from the respective initial values Pcs, Pos at the predetermined set values $\alpha$, $\beta$ through second transient control based on elapsed time from the shift-command instant t1 as shown in FIG. 5 instead of first transient control based on the degree of shift development as shown in FIG. 4. If shift control based on the degree of shift development as shown in FIG. 4 is carried out under such conditions, the aforementioned inconveniences arise: longer shift-control time which elongates working time of solenoid valves for controlling the working oil pressure for the friction elements with a problem of operation noise raised; and requirement to more attentively fulfill an action when a change in situation occurs during shift due to operation of an accelerator pedal, etc. It is to be understood that the illustrative embodiment can avoid occurrence of such inconveniences.

Even if the engagement-side and release-side working-oil-pressure command values Pc, Po are changed during short time B at sharp gradients $\alpha$, $\beta$, greater shift shock cannot occur, since the vehicle speed VSP is very low, close to zero (<VSPs), and thus rotation inertia causing shift shock is smaller. Moreover, completion of the shift during short time B means that the shift is finished before rise of the vehicle speed VSP, resulting in no occurrence of a shift shock.

Further, in the illustrative embodiment, when carrying out transient control of the engagement-side and release-side working-oil-pressure command values Pc, Po at low vehicle speed VSP (<VSPs), those values Pc, Po are changed at constant gradients $\alpha$, $\beta$ as shown in FIG. 5, enabling simplified shift control in accordance with shift elapsed time, resulting in achievement of the above effect with lower cost.

Furthermore, in the illustrative embodiment, control of changing the engagement-side and release-side working-oil-pressure command values Pc, Po at constant gradients $\alpha$, $\beta$ as shown in FIG. 5 is carried out only during the set time B, which is followed by control of bringing command values Pc, Po to respective final control values in one stroke. This allows shift control based on shift elapsed time to surely finish during the set rime B, leading to more reliable achievement of the above effect.

Having described the present invention with regard to the preferred embodiment, it is noted that the present invention is not limited thereto, and various changes and modifications can be made without departing from the scope of the present invention.

By way of example, in the illustrative embodiment, the engagement-side and release-side working-oil-pressure command values Pc, Po are changed during the set time B at constant gradients α, β as shown in FIG. 5. Optionally, if no shift shock occurs, the command values Pc, Po may be brought to respective final control values in one stroke at the shift-command instant t1. In this alternate, control is carried out such that with the steps 29–32 in FIG. 3 omitted, if it is determined at the step 22 that the vehicle speed VSP is low (VSP<VSPs), the step 33 is executed immediately. This alternate allows determination of the engagement-side and release-side working-oil-pressure command values Pc, Po during the shortest period of time and in a control form without any occurrence of a shift shock, resulting in possible provision of greatly valuable shift control.

The entire contents of Japanese Patent Application P2000-282343 are incorporated hereby by reference.

What is claimed is:

1. An automatic transmission, comprising:
   a plurality of friction elements, the friction elements being selectively engaged at shift through respective oil pressures controlled individually to determine a selected gear position; and
   a controller that controls the oil pressures for the friction elements whose state is to be switched,
   wherein the controller carries out a first transient control in accordance with a degree of shift development determined based on at least a vehicle speed, and
   wherein the controller carries out instead of the first transient control a second transient control in accordance with an elapsed time from shift when the vehicle speed is too low to provide determination of the degree of shift development.

2. The automatic transmission as claimed in claim 1, wherein the second transient control is carried out with the oil pressures changing at predetermined gradients, respectively.

3. The automatic transmission as claimed in claim 2, wherein the second transient control is carried out during a predetermined period of time.

4. The automatic transmission as claimed in claim 3, wherein the second transient control is followed by control of bringing the oil pressures to respective final values in one stroke.

5. The automatic transmission as claimed in claim 1, wherein the second transient control is carried out with the oil pressures being brought to respective final values in one stroke.

6. A method of controlling an automatic transmission with a plurality of friction elements, the friction elements being selectively engaged at shift through respective oil pressures controlled individually to determine a selected gear position, the method comprising:
   controlling the oil pressures for the friction elements whose state is to be switched;
   carrying out a first transient control in accordance with a degree of shift development determined based on at least a vehicle speed; and
   carrying out instead of the first transient control a second transient control in accordance with an elapsed time from shift when the vehicle speed is too low to provide determination of the degree of shift development.

7. The method as claimed in claim 6, wherein the second transient control is carried out with the oil pressures changing at predetermined gradients, respectively.

8. The method as claimed in claim 7, wherein the second transient control is carried out during a predetermined period of time.

9. The method transmission as claimed in claim 8, wherein the second transient control is followed by control of bringing the oil pressures to respective final values in one stroke.

10. The method as claimed in claim 6, wherein the second transient control is carried out with the oil pressures being brought to respective final values in one stroke.

11. A system for controlling an automatic transmission with a plurality of friction elements, the friction elements being selectively engaged at shift through respective oil pressures controlled individually to determine a selected gear position, the system comprising:
    means for controlling the oil pressures for the friction elements whose state is to be switched;
    means for carrying out a first transient control in accordance with a degree of shift development determined based on at least a vehicle speed; and
    means for carrying out instead of the first transient control a second transient control in accordance with an elapsed time from shift when the vehicle speed is too low to provide determination of the degree of shift development.

* * * * *